United States Patent [19]

Meehan

[11] Patent Number: 5,377,161
[45] Date of Patent: Dec. 27, 1994

[54] METHOD OF DETERMINING TRAVEL TIME IN DRILL STRING

[75] Inventor: Richard J. Meehan, Cambridge, England

[73] Assignee: Geco-Prakla Inc., Houston, Tex.

[21] Appl. No.: 113,533

[22] Filed: Aug. 27, 1993

[30] Foreign Application Priority Data

Sep. 18, 1992 [GB] United Kingdom ............ 9219769

[51] Int. Cl.$^5$ .................................................. G01V 1/40
[52] U.S. Cl. ................................ 367/82; 340/854.4
[58] Field of Search .................... 367/82, 81; 340/854.4

[56] References Cited

U.S. PATENT DOCUMENTS 4,829,489 5/1989 Rector ................................ 367/82
5,138,875 8/1992 Booer ................................ 73/151

*Primary Examiner*—Ian J. Lobo
*Attorney, Agent, or Firm*—Wayne I. Kanak

[57] ABSTRACT

During a drilling operation, the vibrational energy produced by a drill bit cutting through the earth excites a drill string and the energy near the top of the drill string is mounted by a transducer. A reflection coefficient series is derived from the transducer output such that each reflection coefficient corresponds to a drill string impedance discontinuity. One of the reflection coefficients is identified with a predetermined point of the drill string and energy travel time in the drill string is determined from the position of the one reflection coefficient in the series to the position in the series of a further coefficient.

24 Claims, 7 Drawing Sheets

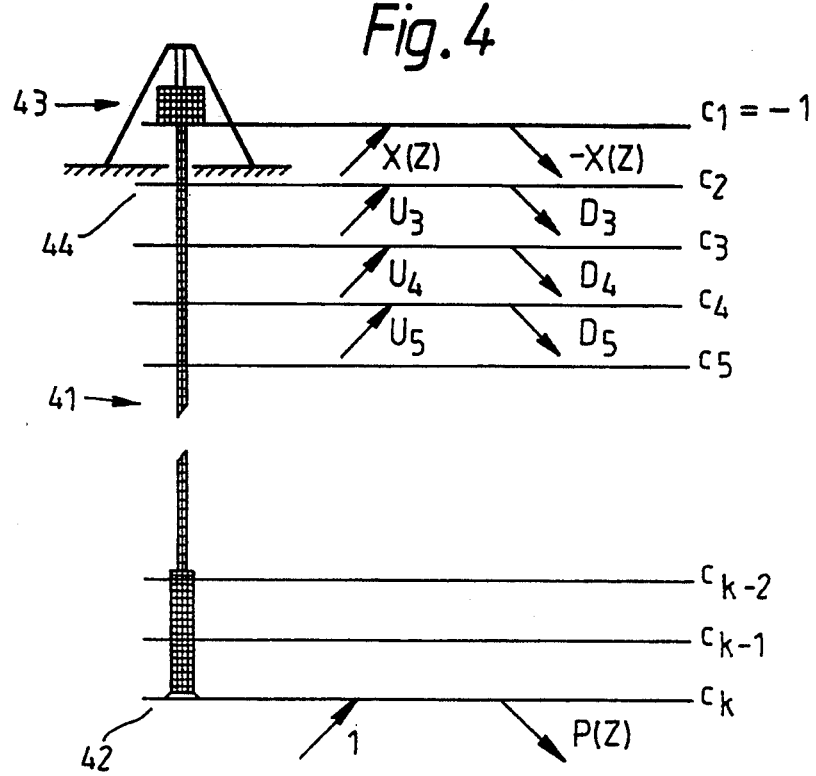
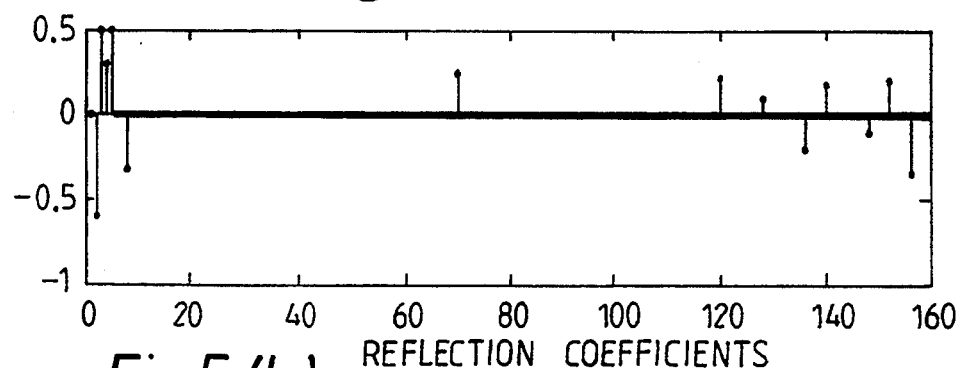
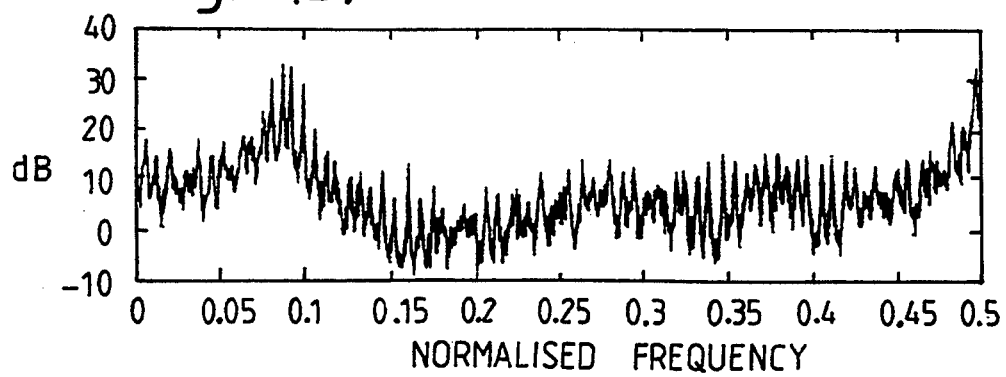

NORMALISED FREQUENCY

METHOD OF DETERMINING TRAVEL TIME IN DRILL STRING

BACKGROUND OF THE INVENTION

1. Field of the Invention

The present invention relates to a method of determining the travel time of an elastic signal from a predetermined point of a drill string to a transducer spaced on the drill string from the predetermined point.

2. Description of the Related Art

During the drilling of a well, it is useful to know the time taken by an elastic wave to travel from one part of the drill string to another, for instance from the bit to a transducer placed near the top of the drill string. Although an estimation of the travel time may be made on the basis of the length of the drill string and the speed of propagation of the energy in the material of which the drill string is constructed, such an estimation does not correlate with actual travel times. This is because the drill string is made up of a plurality of sections with impedance discontinuities between the sections. The impedance discontinuities create energy reflections which interact with each other and with the direct upwardly propagating energy to alter the effective velocity of propagation of the energy within the drill string.

Knowledge of propagation time along the drill string is particularly useful for the technique known as "checkshot while drilling". According to this technique, the energy generated by the drill bit and propagating into the earth is used as a seismic source. Direct and reflected energy is detected by a transducer such as a geophone, for instance located on the surface of the earth some distance away from the drill string. A further transducer is mounted near the top of the drill string. The outputs from the transducers may then be processed to reveal information, for instance about the strata through which the drill bit is passing or ahead of the drill bit. However, in order to make use of the transducer output signals, it is required to know the time taken by the acoustic energy generated at the drill bit to travel up the drill string to arrive at the transducer on the drill string.

The applicants are presently aware of the following prior art, none of which is considered relevant to the present invention: EP-A-0409304; U.S. Pat. No. 4,926,391; U.S. Pat. No. 4,718,048; U.S. Pat. No. 4,829,489; and "The Use of Drill-Bit Energy as a Down Hole Seismic Source" by J. W. Rector III and B. P. Marion, Geophysics, Vol 56 No 5 (May 1991), pp 628-634.

SUMMARY OF THE INVENTION

According to one aspect of the invention, there is provided a method of determining the travel time of an elastic signal from a predetermined point of a drill string to a transducer spaced on the drill string from the predetermined point, the method comprising: modeling the drill string as a one dimensional layered medium of equal travel time layers; generating vibrational energy in the drill string by means of a vibrational energy source on the drill string; deriving from an output signal of the transducer a reflection coefficient series corresponding to the modeled drill string each reflection coefficient of which corresponds to an impedance discontinuity in the drill string; identifying one reflection coefficient of the series with the predetermined point of the drill string and a further reflection coefficient with a known structure in the drill string spaced from the predetermined point; and determining the travel time from the positions of the one reflection coefficient and the further reflection coefficient in the reflection coefficient series.

According to a second aspect of the invention, there is provided a method of determining the travel time of an elastic signal from a predetermined point of a drill string to a transducer spaced on the drill string from the predetermined point, the method comprising: modeling the drill string as a one dimensional layered medium of equal travel time layers; generating vibrational energy in the drill string by means of a vibrational energy source on the drill string, deriving from an output signal of the transducer a reflection coefficient series corresponding to the modeled drill string; each reflection coefficient of which corresponds to an impedance discontinuity in the drill string identifying at least one reflection coefficient corresponding to a structure in the drill string; determining the rate of change of position of said at least one reflection coefficient in the reflection coefficient series as the length of the drill string; increases and determining the velocity of the signal from the rate of change of position, and determining the travel time from the velocity and the length of the drill string.

By modeling the drill string as a one dimensional layered medium it is possible to process the transducer output signal to derive reflection coefficients related to the drilling structure. It is thus possible to provide a method which permits accurate estimation of travel times in a drill string. Such a method may be employed in any application where drill string travel times are required, such as in checkshot while drilling.

In the first aspect of the invention, the predetermined point of the drill string is preferably the drill bit or a connection between a bottom hole assembly and an adjacent section of the drill string. The known structure is typically the transducer or a structure at the point in the drill string where the transducer is located.

In the second aspect of the invention, it is preferred that a plurality of reflection coefficients, typically all relating to one structure such as the bottom hole assembly, are monitored and a rate of change is determined which provides the best fit for the coefficients.

The vibrational energy source is usually the interaction of the drill bit with the formation in drilling. Rollercone bits are preferred as vibration sources. The transducer is conveniently located at or near the top of the drill string such as on the traveling block and can respond to force, displacement velocity or acceleration.

The reflection coefficient series can be derived by determining the filter coefficients of a filter model, such as an auto-regressive filter model, by fitting the filter output signal to the transducer output signal and deriving the reflection coefficients from the filter coefficients.

Typically this is achieved by correcting the filter coefficients of a lattice filter representing the reflection coefficient series. Where the transducer is spaced from the traveling block, an auto-regressive moving average model of the transducer output signal is calculated, the reflection coefficient series being derived from the autoregressive part of the model. In this case it is preferred that the power spectrum of the transducer output signal is divided by the moving average model to form a quotient, the reflection coefficient series is derived from the quotient. The reflection coefficient series can be derived from the auto-correlation function of the transducer output signal.

BRIEF DESCRIPTION OF THE DRAWINGS

The invention will be further described, by way of example, with reference to the accompanying drawings, in which:

FIG. 4 shows a drill string with an impulse applied to a bit thereof;

FIG. 5 illustrates at (a) an artificial reflection coefficient series and at (b) the spectrum of upgoing waves measured just below a traveling block of the drill string;

DESCRIPTION OF THE PREFERRED EMBODIMENTS

A drill string consists of a series of steel cylinders of different lengths and cross sectional areas joined together. Such a drill string can be modeled as a layered impedance system for instance as disclosed by J. F. Claerbout in "Fundamentals of Geophysical Data Processing", Blackwell Scientific Publications, California, 1985. The drill string is divided into a number of sections or layers, the thicknesses of which are such that it takes the same amount of time for an axial wave to travel across each section. Within each layer, the cross sectional area and material properties remain constant. This model is similar to the lossless tube model used in speech processing as disclosed by L. R. Rabiner and R. W. Schafer in "Digital Processing of Speech Signals", Prentice, N.J., 1978.

Figure 1:
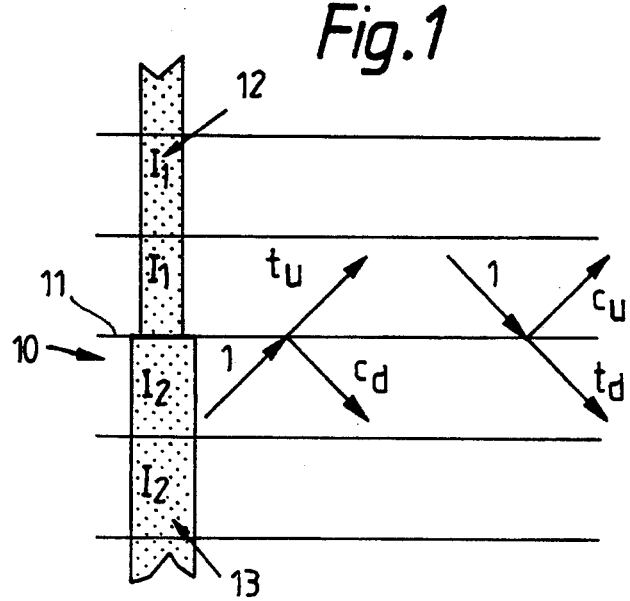
FIG. 1 illustrates schematically part of a drill string bottom hole assembly.

FIG. 1 shows pan of the bottom hole assembly (BHA) of a typically drill string. The interface 11 between two sizes of drill collars 12 and 13, for an elastic wave traveling upwards, can be characterized by two coefficients, names a reflection coefficient $c_d$ and a transmission coefficient $t_u$. Thus, for a unit amplitude incident wave, the amplitude of the transmitted part of the wave is $t_u$ and that of the reflected part is $c_d$. For reasons of continuity, the wave amplitudes must be the same of either side of the interface 11. This gives rise to the relationship:

$$t_u = 1 + c_d \tag{1}$$

Similarly for a unit impulse traveling downwards:

$$t_d = 1 + c_u \tag{2}$$

where $C_u$ and $t_d$ are the reflection and transmission coefficients, respectively, for a downward traveling wave.

The energy in the wave is equal to the wave amplitude squared multiplied by a proportionality factor which depends upon the material properties. For example if the amplitude measured is velocity, then the proportionality factor is impedance I. If the impedance in the upper drill collar 12 is $I_1$ and that in the lower collar 13 is $I_2$, then energy conservation before and after incidence gives:

$$I_2 = I_2 C_d^2 + I_1 t_u^2 \tag{3}$$

for an upward traveling wave. Substituting equation (1) in equation (3) gives:

$$c_d = \frac{I_2 - I_1}{I_1 + I_2} \tag{4}$$

The reflection coefficient depends upon the size of the impedance change across the interface. Using the same argument gives:

$$c_u = \frac{I_1 - I_2}{I_1 + I_2} \tag{5}$$

hence:

$$c_u = -c_d \tag{6}$$

Figure 2:
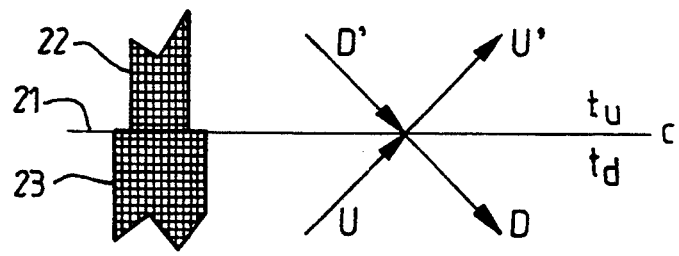
FIG. 2 illustrates schematically a typical drill string interface.

The general case of an interface 21 in a drill string is illustrated in FIG. 2. The upward and downward going waves in the upper layer 22 are represented by U' and D' respectively, while the upward and downward waves in the lower layer 23 are shown as U and D, respectively. The reflection coefficient at the interface is c for an upward traveling wave while the transmission coefficients are denoted as $t_u$ and $t_d$.

Thus:

$$U' = t_u U - cD'D + t_d D' + cU \tag{7}$$

or, in matrix form:

$$\begin{bmatrix} t_u & 0 \\ -c & 1 \end{bmatrix} \begin{bmatrix} U \\ D \end{bmatrix} = \begin{bmatrix} 1 & c \\ c & t_d \end{bmatrix} \begin{bmatrix} U' \\ D' \end{bmatrix} \tag{8}$$

Premultiplying by the inverse of the left hand matrix and simplifying gives:

$$\begin{bmatrix} U \\ D \end{bmatrix} = \frac{1}{t_u} \begin{bmatrix} 1 & c \\ c & 1 \end{bmatrix} \begin{bmatrix} U \\ D \end{bmatrix}' \quad (9)$$

Figure 3:
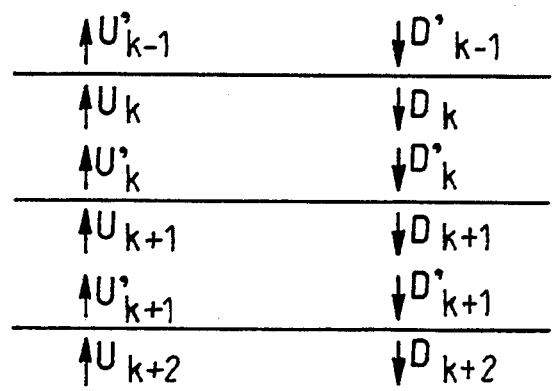
FIG. 3 illustrates a series of drill string layers of equal travel time.

For a series of layers as illustrated in FIG. 3, equation (9) can be rewritten as:

$$\begin{bmatrix} U \\ D \end{bmatrix}_{k+1} = \frac{1}{t_{uk}} \begin{bmatrix} 1 & c_k \\ c_k & 1 \end{bmatrix} \begin{bmatrix} U \\ D \end{bmatrix}_k' \quad (10)$$

for the interface between each $k$ th and $(k+1)$th layer.

The travel time across each layer is $T/2$, where $T$ is the data sampling interval. This means that travel across a layer can be indicated by multiplication by $\sqrt{Z}$ where $Z$ is the unit delay operator. To make the notation simpler, the transmission coefficient $t_u$ will be referred to as $t$. Therefore, in the $k$ th layer:

$$\begin{bmatrix} U \\ D \end{bmatrix}_k' = \begin{bmatrix} 1/\sqrt{Z} & 0 \\ 0 & \sqrt{Z} \end{bmatrix} \begin{bmatrix} U \\ D \end{bmatrix}_k \quad (11)$$

Substituting equation (11) into equation (10) and simplifying gives the layer matrix:

$$\begin{bmatrix} U \\ D \end{bmatrix}_{k+1} = \frac{1}{\sqrt{Zt_k}} \begin{bmatrix} 1 & c_k Z \\ c_k & Z \end{bmatrix} \begin{bmatrix} U \\ D \end{bmatrix}_k \quad (12)$$

This layer matrix can be used to extrapolate the signal measured in one layer to that measured in another. For example, to extrapolate from layer $k$ to layer $k+2$:

$$\begin{bmatrix} U \\ D \end{bmatrix}_{k+2} = \quad (13)$$

$$\frac{1}{\sqrt{Zt_{k+1}}} \begin{bmatrix} 1 & c_{k+1} Z \\ c_{k+1} & Z \end{bmatrix} \frac{1}{\sqrt{Zt_k}} \begin{bmatrix} 1 & c_k Z \\ c_k & Z \end{bmatrix} \begin{bmatrix} U \\ D \end{bmatrix}_k$$

In general, from Claerbout (see above), the form of the product of $k$ layer matrices is given by:

$$\frac{1}{\sqrt{Z^k} \prod_{i=1}^{k} t_i} \begin{bmatrix} F(Z) & Z^k G\left(\frac{1}{Z}\right) \\ G(Z) & Z^k F\left(\frac{1}{Z}\right) \end{bmatrix} \quad (14)$$

where $F(Z)$ and $G(Z)$ are polynomials in $Z$. These polynomials are related to each other. Their coefficients are determined by the values of the reflection coefficients. A more detailed investigation of their structure can be found in Claerbout.

For the drill string 41 shown in FIG. 4, if an impulse is applied to the bit 42, then an axial wave will propagate through the drill string, reflecting from all the impedance changes. This will give rise to a wave $P(Z)$ scattered back from the drill string. Assuming that there is a perfect reflector 43 at the top of the drill string which has a reflection coefficient of $-1$ for waves traveling upwards, then if the upgoing waves just below this top reflector are designated as $X(Z)$, then the downgoing waves must be $-X(Z)$. The product of the layer matrices can be used to determine the waves in terms of the reflection coefficients:

$$\begin{bmatrix} 1 \\ P(Z) \end{bmatrix} = \frac{1}{\sqrt{Z^{k-1}} \prod_{i=2}^{k} t_i} \begin{bmatrix} F(Z) & Z^{k-1} G\left(\frac{1}{Z}\right) \\ G(Z) & Z^{k-1} F\left(\frac{1}{Z}\right) \end{bmatrix} \begin{bmatrix} X(Z) \\ -X(Z) \end{bmatrix} \quad (15)$$

From the first part of equation (15):

$$X(Z) = \frac{\sqrt{Z^{k-1}} \prod_{i=2}^{k} t_i}{F(Z) - Z^{k-1} G\left(\frac{1}{Z}\right)} \quad (16)$$

$X(Z)$ is an auto-regressive (AR) process. If a sensor were placed just below the second reflector 44 shown in FIG. 4, it would measure the sum of the upgoing and downgoing waves $U_3$ and $D_3$. Equation (12) gives:

$$\begin{bmatrix} U \\ D \end{bmatrix}_3 = \frac{1}{\sqrt{Zt_2}} \begin{bmatrix} 1 & c_2 Z \\ c_2 & Z \end{bmatrix} \begin{bmatrix} X(Z) \\ -X(Z) \end{bmatrix} \quad (17)$$

From this, the measured signal is given by:

$$U_3 + D_3 = \frac{\sqrt{Z^{k-1}} \prod_{i=2}^{k} t_i [1 + c_2 - Z(1 + c_2)]}{\sqrt{Zt_2} \left[ F(Z) - Z^k G\left(\frac{1}{Z}\right) \right]} \quad (18)$$

This is an auto-regressive moving average (ARMA) process and the AR part is the same as in equation (16). This procedure can be continued to see what would be measured further down the drill string. At each successive layer, the AR part of the signal is the same but the moving average (MA) part changes. For $U_4 + D_4$ the MA part is given by:

$$[Z^0(1+c_3) + 0Z^1 - Z^2(1+c_3)] \quad (19)$$

and for $U_5 + D_5$ it is:

$$\begin{aligned} &+ Z^0(1 + c_4) \\ &+ Z^1[(1 + c_4)(c_2(c_3 - 1) + c_3)] \\ &- Z^2[(1 + c_4)(c_2(c_3 - 1) + c_3)] \\ &- Z^3(1 + c_4) \end{aligned} \quad (20)$$

Further down, the MA part becomes larger and more complicated. However certain things about the nature of this MA signal may be observed. First, it depends only on the reflectors above the measurement point. This is important when it comes to deciding where to place the sensor on a real drill string. Second, there is a symmetry to the coefficients of the MA polynomial. For a polynomial that extends to $Z^k$, the coefficient of the highest power of $Z$ is equal to the coefficient of $Z^0$ multiplied by $-1$. Similarly the coefficient of $Z^{k-1}$ is equal to $-1$ times the coefficient of $Z^1$, and so on, i.e.:

$$a_1Z^0 + a_2Z^1 + a_3Z^2 + K - a_3Z^{k-2} - a_2Z^{k-1} - a_1Z^k \quad (21)$$

If k is even then the coefficient of $Z^{k/2}$ is zero (see equation (19)). One consequence of this is that the roots of the MA polynomial must always lie on the unit circle.

Synthetic data were used to determine how to calculate the reflection coefficients from measurements made near the top of the drill string. The effects of anti-alias filters and sensor position were also considered.

FIG. 5(a) shows a reflection coefficient series intended to represent a typical drill string. The reflection coefficient due to the effective top of the drill string, the traveling block (TB), is assumed to have a value of $-1$ for upward traveling waves, and is not shown. The first few reflectors represent such things as the hook, swivel, kelly spinner, etc. The reflector at position 70 represents a change from drill pipe to heavyweight drill pipe. The remaining reflectors below position 120 represent changes in section in the BHA. The bit is at position 156.

If this drill string is excited by a white noise input at the bit (representing the bit/rock interaction) and the upgoing waves are measured just below the TB, a signal is obtained whose spectrum is shown in FIG. 5(b). This signal is equivalent to the signal X(Z) defined hereinbefore. As can be seen, it is an AR process. The AR parameters of this signal are the coefficients of the Z polynomial on the bottom line of equation (16). These coefficients depend upon the reflection coefficients. There are many ways to determine both the AR parameters and the reflection coefficients. These divide into two main categories namely block data methods and sequential data methods. Block data methods divide the available data into sections which are processed independently. The most widely known technique for estimating the AR parameters and reflection coefficients from a finite set of time samples is the Burg algorithm. If a large number of time samples is available, then the Yule-Walker method may be used. Sequential data algorithms may be applied to a continuous stream of time data samples. These algorithms update estimates of the AR parameters (or reflection coefficients) as new data samples become available. Examples of such techniques are least mean square (LMS), recursive least squares (RLS) and least squares lattice (LSL) filters. These techniques are well known and may be found, for instance, in "Adaptive Filter Theory" by S Haykin, Prentice Hall, New Jersey, 1986, "Modern Spectral Estimation: Theory and Application" by S. M. Kay, Prentice Hall, New Jersey, 1983, and "Digital Spectral Analysis with Application" by S. L. Marple Jr., Prentice Hall, New Jersey, 1987.

To obtain both the AR parameters and the reflection coefficients, the Yule-Walker approach will be described.

Basically the approach is to make some estimate of the auto-correlation sequence (ACS) of the measured signal and then to use the Levinson recursion to determine both the AR parameters and the reflection coefficients. If the data set is large, then the estimate of the ACS can be easily obtained using the fast Fourier transform (FFT).

Figure 6:
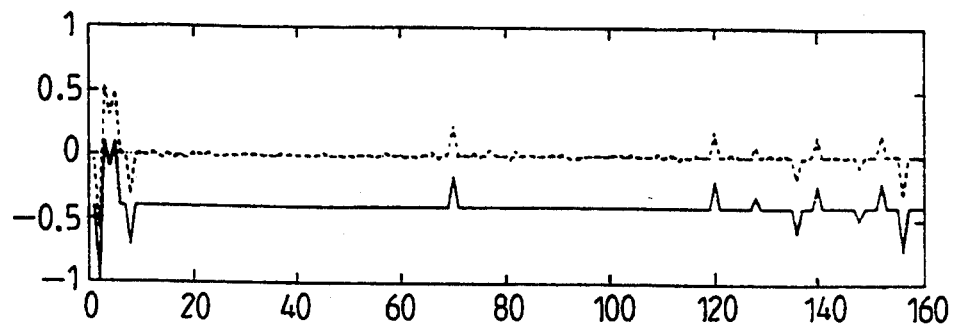
FIG. 6 illustrates an original reflection coefficient series and an estimated series.

Applying the Yule-Walker approach to the signal shown in FIG. 5(b) yields the set of reflection coefficients shown in FIG. 6. The solids line shows the original reflection coefficient series (offset for clarity), while the dashed line is the Yule-Walker estimate. Agreement between the two is very good.

As disclosed above, the reflection coefficients represent the boundaries between impedance layers with the layers defined such that the travel time across each is equal to T/2, where T is the data sampling interval. For example, if the signal X(Z) is sampled at 500 Hz, then the sampling interval is 0.002 seconds. The travel time across each layer is then 0.001 seconds. Hence, if the bit can be identified as being represented by reflection 156 then the direct travel time of a signal from the bit to the measurement point is 0.156 seconds.

The resolution in terms of length depends upon the velocity of sound in the drill string. If the sampling frequency is increased then the spatial resolution is increased. The limits of this resolution depend on the frequency content of the signal. For example, if there is no energy in the signal above 200 Hz then sampling at 1000 Hz will not increase the useful resolution of the derived reflection coefficients. There are three things which control the frequency content of the measured signal:

the bit/rock interaction. This is the (assumed) white noise driving process. If this is bandlimited, then the measured signal will be bandlimited;

attenuation. The higher the frequency of vibration, the more energy is lost (radiated to the mud, lost to string/borehole interactions, etc.);

the drill string. Due to its periodic structure, the drill string contains stop bands in its transfer function. For a typical drill string, the first stop band is between 200 and 300 Hz and is several tens of Hz wide.

One effect of the limit on the resolution is that drill string features are smaller (shorter in travel time) than the limit of resolution cannot be resolved. This is the case for tooljoints. The typical magnitude of the reflection coefficient for the impedance contrast between the body of a drillpipe and a tooljoint is about 0.5, but such a reflector is followed almost immediately by another reflector of equal magnitude but opposite sign. Because the two reflectors are so close together it would be necessary to sample at a very high frequency to resolve them.

Figure 7:
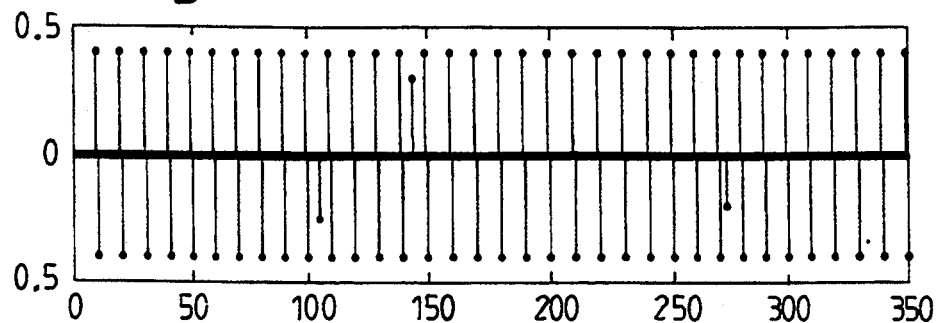
FIG. 7 illustrates at (a) a reflection series showing tooljoints and at (b) a system frequency response.
Figure 7:
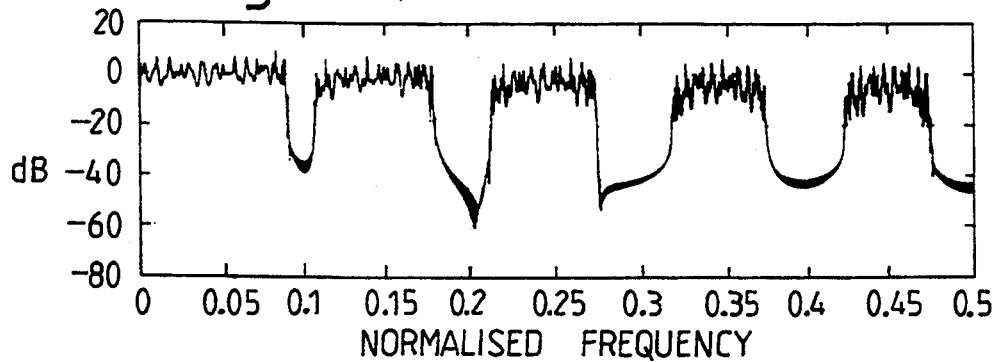

For a reflection coefficient series shown in FIG. 7(a), the alternating reflection coefficients represent the tooljoint/drill pipe boundaries. In addition there are some smaller reflection coefficients which represent changes in the average impedance of the drill string (e.g. between the different grades of drill pipe). The frequency response of this system is shown in FIG. 7(b).

Figure 8:
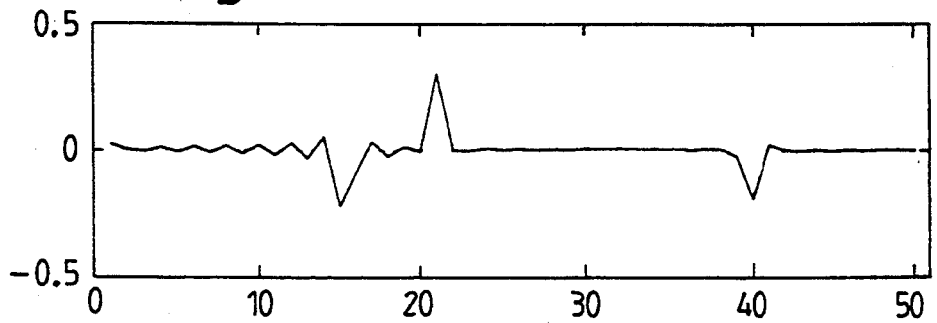
FIG. 8 illustrates a reflection series using part of a spectrum.

The stop bands can be clearly seen. If, however, the reflection coefficients are calculated using only that part of the data before the first stop band, then the result is as shown in FIG. 8. The reflectors due to the average impedance changes are visible, but hose due to the tooljoints are not.

Figure 9:
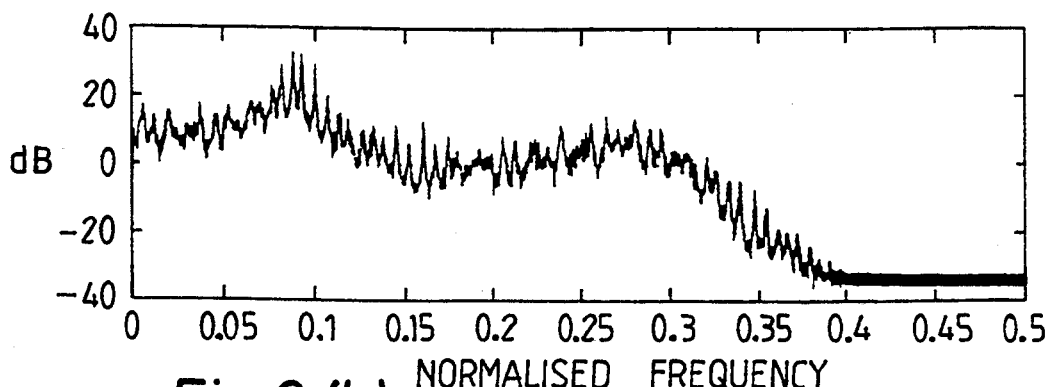
FIG. 9 shows at (a) a spectrum after low pass filtering and at (b) a reflection series calculated from the filtered spectrum.
Figure 9:
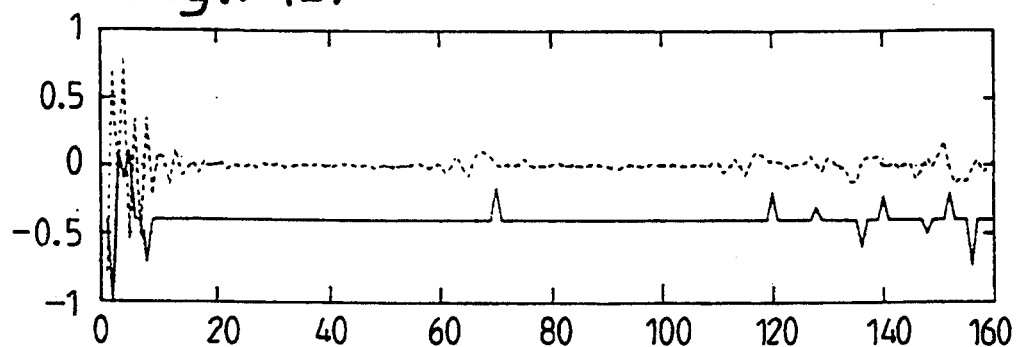

In practice, when data from an accelerometer or other sensor are gathered, analogue low pass filtering is used to prevent aliasing of the signal. FIG. 9(a) shows the effect of a low pass filter on the spectrum of the signal X(Z). If this spectrum is used to generate the ACS and then the reflection coefficients, the result is as shown in FIG. 9(b). The solid line shows the original series (offset for clarity) and the dashed line shows that derived from the filter spectrum.

Obviously the low pass filter has a detrimental effect on the processing. The reflectors are much less distinct and appear to have shifted towards the top of the drill string. This is because, after filtering, the measured signal is no longer an AR process and therefore cannot be adequately modeled as such.

Figure 10:
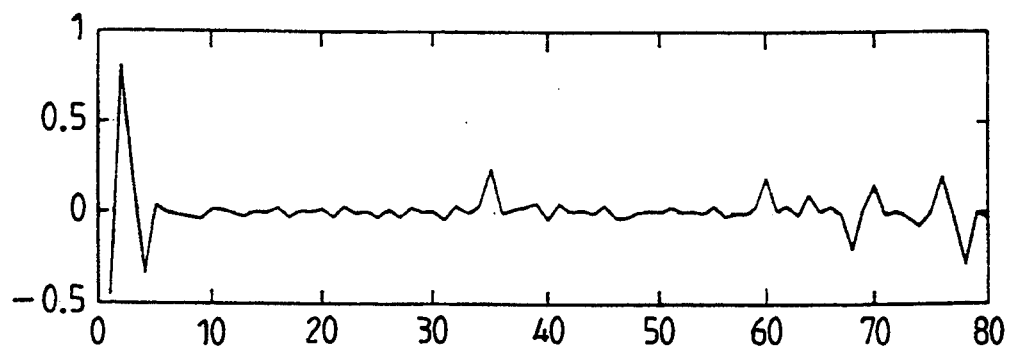
FIG. 10 shows a reflection series calculated using a first half of a filtered spectrum.

The low pass filter is designed to attenuate the high frequency part of the signal, and it should have little effect on the low frequency part. By using the first half of the spectrum in FIG. 9, the set of reflection coefficients shown in FIG. 10 can be calculated. Although the resolution has been halved, the reflectors are in the correct position and are quite distinct.

The preceding description has dealt with how to process the upgoing waves measured just below the TB. In reality, it is not possible to measure just the upgoing part of the signal. Usually the sum of the up and downgoing waves is measured at some point below the TB, but not just below. As described above, such a signal is an AR/VIA process in which the MA part depends only upon the reflectors above the measurement point and the AR part is the same as that of the upgoing waves measured just below the TB.

Figure 11:
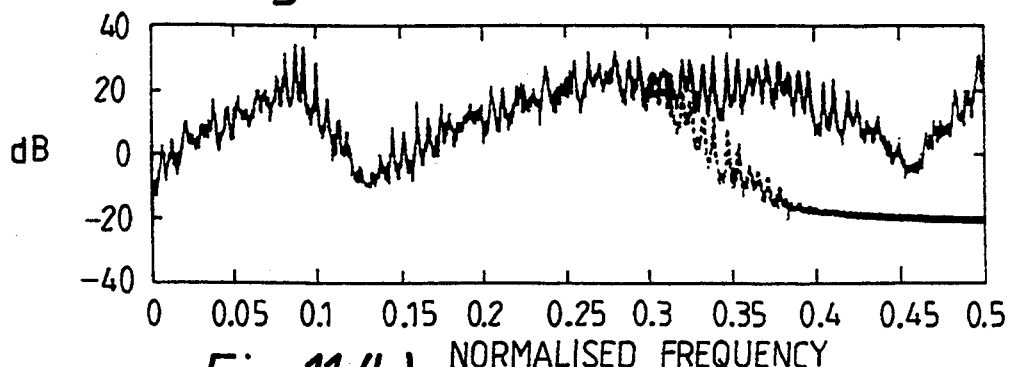
FIG. 11 shows at (a) the spectrum of a signal measured just below a drill string swivel and at (b) a reflection coefficient series calculated from a first half of the accelerometer spectrum.
Figure 11:
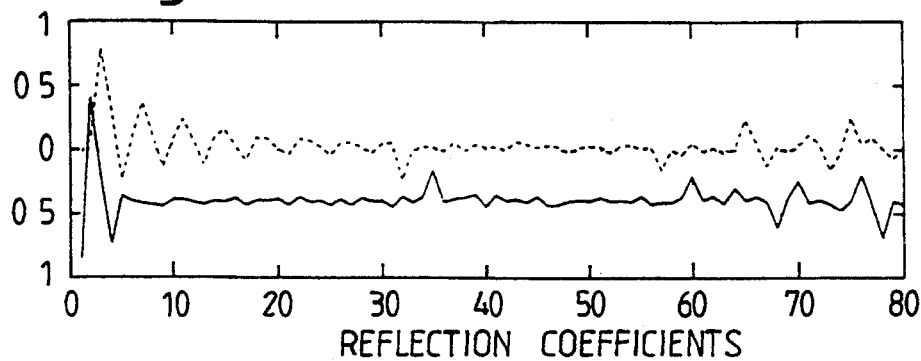

Referring to FIG. 5, if an accelerometer is placed just below reflection 5 (which represents the bottom of the swivel) then, for the same white noise excitation as before, the spectrum shown as the solid line in FIG. 11(a) should be measured. The dashed line shows the same signal after low pass filtering. The zeros are due to the MA part of the signal.

In order to recover the reflection coefficients, both the low pass filter and the MA part of the signal must be dealt with. If the reflection coefficients were merely calculated from the first half of the spectrum as before, then the result shown as the dashed line in FIG. 11(b) would be obtained. The solid line shows the results first seen in FIG. 10 for comparison. The effect of the MA part is obvious.

There are many ways to estimate the MA part of an ARMA process for instance as disclosed by Kay or Marple (see above). One simple way is to evaluate the inverse Fourier transform of the reciprocal of the accelerometer power spectrum and then to apply the Levinson recursion to the resulting ACS. To do this successfully, the order of the MA process must be known. This can be determined by counting the zeros in the spectrum. In the first half of the spectrum shown in FIG. 11 there is one obvious zero at a normalized frequency of about 0.13. There is also half a zero at 0. Each full zero required 2 MA parameters to define it, so in this case 3 MA parameters are needed.

Figure 12:
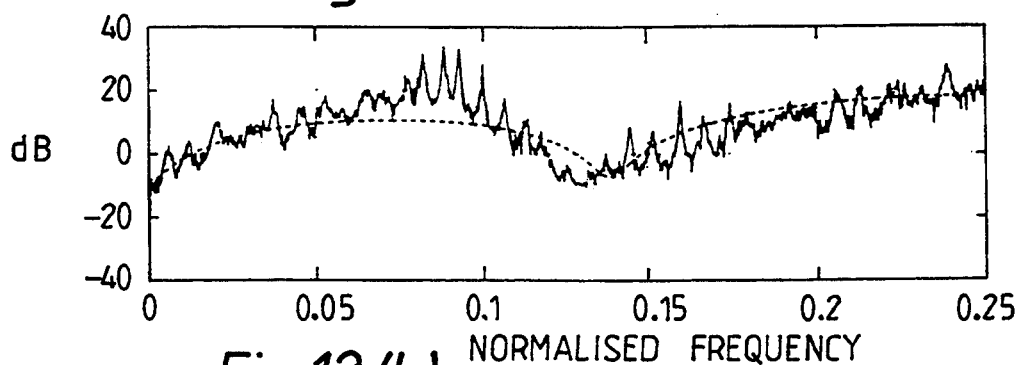
FIG. 12 shows at (a) a first half of an accelerometer spectrum and a spectrum of an MA (3) model and at (b) a reflection series calculated from the ratio of the spectra shown at (a)
Figure 12:
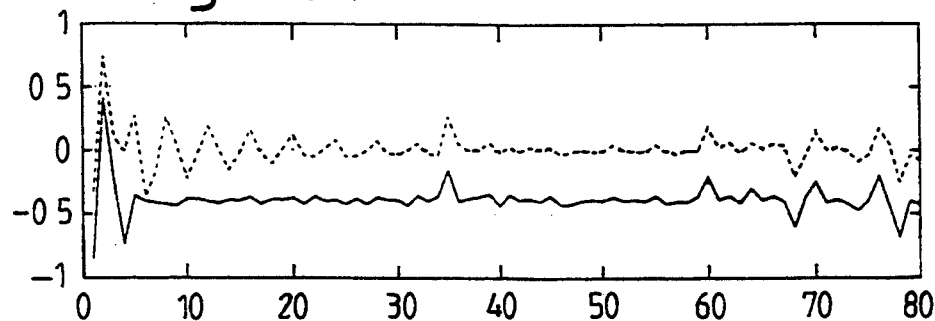

FIG. 12(a) shows both the first half of the accelerometer spectrum (solid line) and the spectrum of a MA(3) model (dashed line) evaluated from the reciprocal of the accelerometer spectrum. If the accelerometer spectrum is divided by the MA(3) spectrum and the reflection coefficients calculated from the result, then the series shown as the dashed line in FIG. 12(b) is obtained. Once again the solid line is from FIG. 10.

The data set used in the following example was obtained while drilling with 17½ inch rollercone bits. An accelerometer was mounted on the swivel. The data were logged at 500 Hz.

Figure 13:
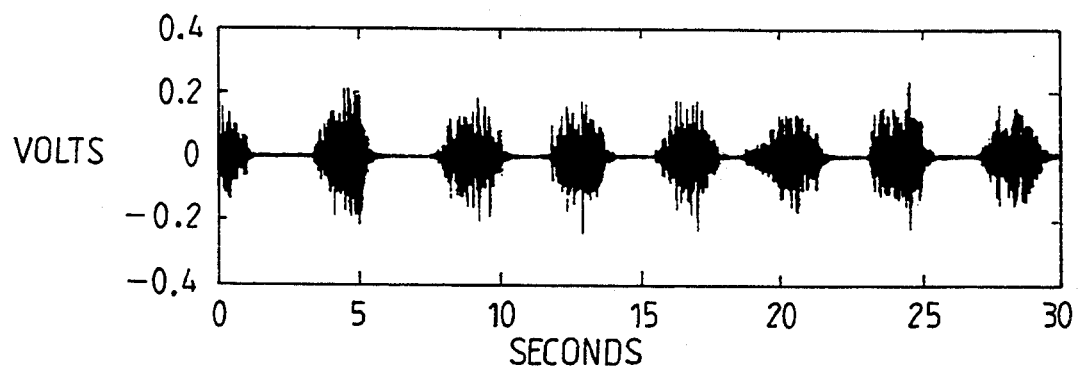
FIG. 13 shows at (a) the measured output of a swivel-mounted accelerometer and at (b) the power spectrum of the measured output.
Figure 13:
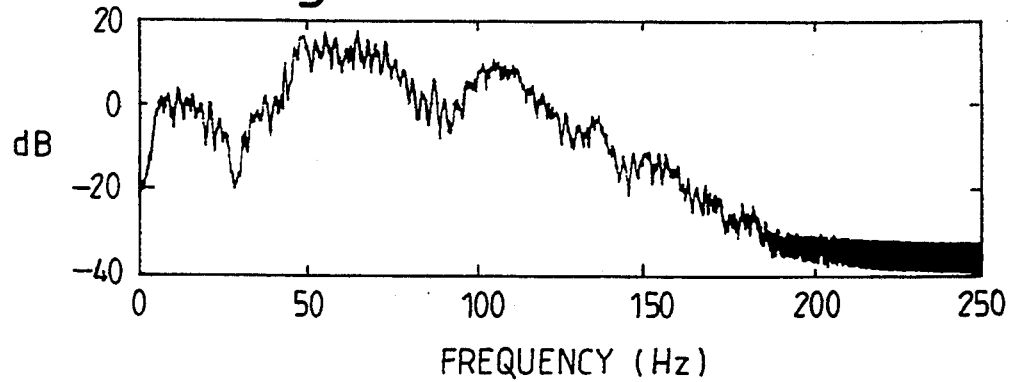

FIG. 13 shows a typical section of time data from accelerometers, and the power spectrum calculated from that data. The amplitude variations in the time data are due to stick slip motion at the bit.

Figure 14:
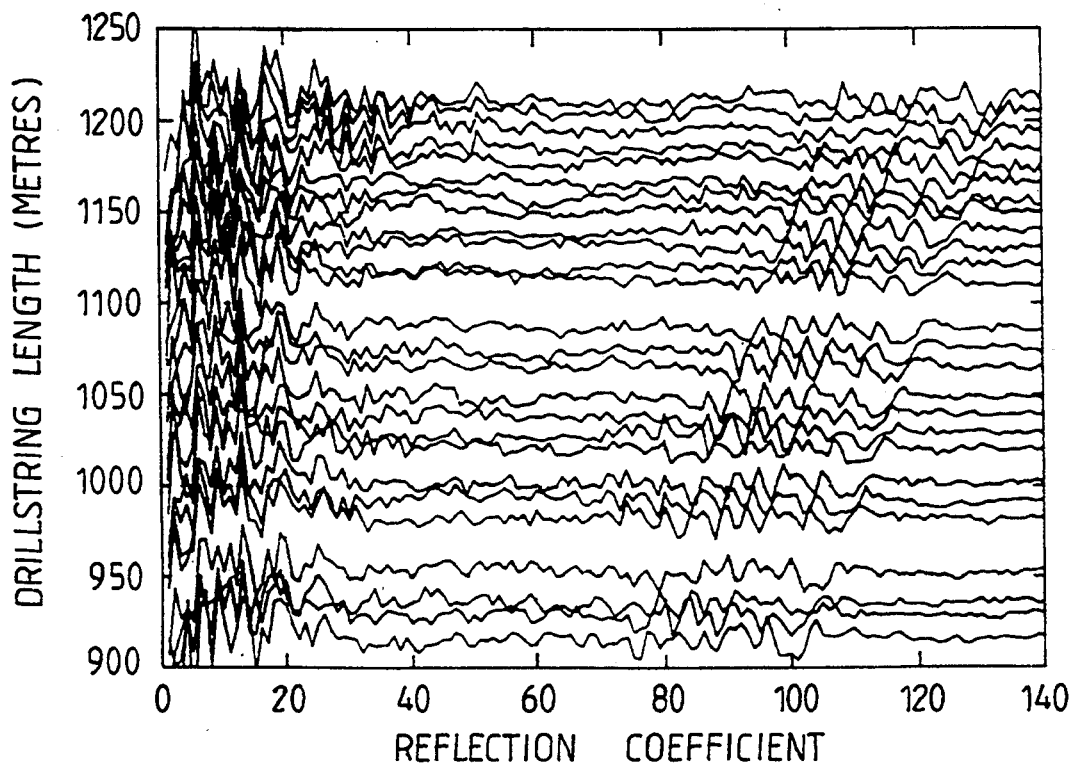
FIG. 14 shows a set of reflection coefficient series for increasing well-depth.
Figure 15:
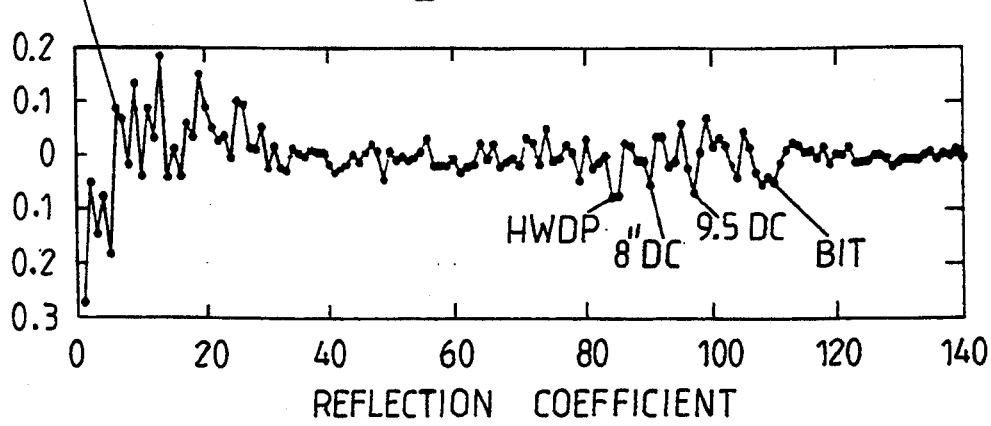
FIG. 15 shows a reflection series for an actual drill string.

Calculating the reflection coefficients for the drill string at increasing depths (using only the first 130 Hz and a MA order of 6) gives FIG. 14. The x-axis is drill string length. The BHA components can clearly be seen moving to the right as the drill string length increases. Since the make-up of the drill string is known, particularly reflection coefficients can be identified with particular parts of the BHA. FIG. 15 shows the reflection series for a drill string length of 1001 meters. The reflector at position 84 is the change from drill pipe to heavyweight drill pipe (HWDP), the change from HWDP to 8 inch drill collars (DC) is at 90, and the change from 8 to 9½ inch DC is at 97. The bit is at position 110. Since a MA(6) model was needed to correctly process the data, the accelerometer is at position 6. Remembering that only the first 130 Hz of the spectrum was used to calculate the reflection coefficient series (which implies a sampling rate of 260 Hz), the travel time from bit to accelerometer is calculated as:

$$\Delta t_{ds} = (110 - 6) \times \frac{1}{260 \text{ Hz}} \times \frac{1}{2} = 0.200 \text{ sec}$$

If the bit has been correctly identified, this travel time is accurate to within ±0.00096 seconds (i.e. half of the travel time across one layer of the layered impedance model, which is defined such that the travel time across each layer is equal to half the sampling interval).

If the bit is difficult to identify, another method may be used to determine travel time. The acoustic velocity in the drill pipe is less than that for a uniform steel pipe, because of its periodic structure. The reflection coefficient image may be used to determine this velocity. As shown in FIG. 14(a), the BHA components move to the right as the drill string gets longer, i.e. as more drill pipe is added. If a feature is chosen in the BHA part of the image which is clearly visible in most of the traces, and a best fit straight line is drawn through the position of this feature on all traces, then the slop of this line gives the acoustic velocity in the drill pipe. Where several features are taken, the least squares fit gradient of all of these can be used to obtain the acoustic velocity.

Doing this for FIG. 14(a) gives a velocity in the drill pipe section of 4930 meters/sec. The BHA section is much shorter than the drill pipe section and is more uniform in structure. If the BHA velocity is assumed to be the same as for uniform steel pipe (i.e. 5150 meters/see) then, for a drill string length of 1001 meters, the travel time from bit to accelerometer is:

$$\Delta t_{ds} = 0.201 \text{ sec}$$

The accuracy of the estimation of drill pipe velocity will improve as the well gets deeper, i.e. as the best fit straight line is calculated on more points. The assumption that the BHA velocity is similar to that of a uniform pipe may be wrong, especially if the BHA contains such components as shock subs and jars. However, the length of the BHA is usually small compared to the overall drill string length; so that the error introduced by this assumption will be small.

I claim:

1. A method of determining the travel time of an elastic signal from a predetermined point of a drill string to a transducer spaced on the drill string from the predetermined point, the method comprising; modeling the drill string as a one dimensional layered medium of equal travel time layers; generating vibrational energy in the drill string by means of a vibrational energy source on the drill string; deriving from an output signal of the transducer a reflection coefficient series corresponding to the modeled drill string, each reflection coefficient of which corresponds to an impedance discontinuity in the drill string; identifying one reflection coefficient of the series with the predetermined point of the drill string and a further reflection coefficient with a known structure in the drill string spaced from the predetermined point; and determining the travel time from the positions of the one reflection coefficient and the further reflection coefficient in the reflection coefficient series.

2. A method as claimed in claim 1, in which the predetermined point is the drill bit.

3. A method as claimed in claim 1, in which the predetermined point is a connection between a bottom hole assembly of the drill string and an adjacent section of the drill string.

4. A method as claimed in claim 1, wherein the known structure comprises the transducer.

5. A method as claimed in claim 1, comprising generating the vibrational energy by the interaction of a drill bit at the bottom of the drill string with an earth formation during drilling.

6. A method as claimed in claim 1, in which the transducer is located adjacent the top of the drill string.

7. A method as claimed in claim 1, in which the derivation of the reflection coefficient series comprises determining the filter coefficients of a filter model by fitting the filter output signal to the transducer output signal, and deriving the reflection coefficient series from the filter coefficients.

8. A method as claimed in claim 7, in which the filter model is an auto-regressive filter model.

9. A method as claimed in claim 8, in which the filter coefficients of the auto-regressive filter are converted into the coefficients of a lattice filter representing the reflection coefficient series.

10. A method as claimed in claim 8, in which the transducer is spaced from a traveling block of the drill string, an auto-regressive moving average model of the transducer output signal is calculated, and the reflection coefficient series is derived from the auto-regressive part of the auto-regressive moving average model.

11. A method as in claim 10, in which a moving average model of the transducer output signal is calculated, a power spectrum of the transducer output signal is divided by the moving average model to form a quotient, and the reflection coefficient series is derived from the quotient.

12. A method as claimed in claim 1, in which the transducer is responsive to force, displacement, velocity or acceleration.

13. A method as claimed in claim 1, in which the reflection coefficient series is derived from the autocorrelation function of the transducer output signal.

14. A method of determining the travel time of an elastic signal from a predetermined point of a drill string to a transducer spaced on the drill string from the predetermined point, the method comprising: modeling the drill string as a one dimensional layered medium of equal travel time layers; generating vibrational energy in the drill string by means of a vibrational energy source on the drill string; deriving from an output signal of the transducer a reflection coefficient series corresponding to the modeled drill string, each reflection coefficient of which corresponds to an impedance discontinuity in the drill string; identifying at least one reflection coefficient corresponding to a structure in the drill string; determining the rate of change of position of said at least one reflection coefficient in the reflection coefficient series as the length of the drill string increases; and determining the velocity of the signal from the rate of change of position, and determining the travel time from the velocity and the length of the drill string.

15. A method as claimed in claim 14, comprising identifying a plurality of reflection coefficients corresponding to said structure and determining the best fit rate of change for the plurality of reflection coefficients to obtain the velocity of the original.

16. A method as claimed in claim 14, in which the vibrational energy is generated by the interaction of a drill bit at the bottom of the drill string with an earth formation during drilling.

17. A method as claimed in claim 14, in which the transducer is located adjacent the top of the drill string.

18. A method as claimed in claim 14, in which the derivation of the reflection coefficient series comprises determining the filter coefficients of a filter model by fitting the filter output signal to the transducer output signal, and deriving the reflection coefficient series from the filter coefficients.

19. A method as claimed in claim 18, in which the filter model is an auto-regressive filter model.

20. A method as claimed in claim 19, in which the filter coefficients of the auto-regressive filter are converted into the coefficients of a lattice filter representing the reflection coefficient series.

21. A method as claimed in claim 19, in which the transducer is spaced from a traveling block of the drill string, an auto-regressive moving average model of the transducer output signal is calculated, and the reflection coefficient series is derived from the auto-regressive pan of the autoregressive moving average model.

22. A method as in claim 21, in which a moving average model of the transducer output signal is calculated, a power spectrum of the transducer output signal is divided by the moving average model to form a quotient, and the reflection coefficient series is derived from the quotient.

23. A method as claimed in claim 14, in which the transducer is responsive to force, displacement, velocity or acceleration.

24. A method as claimed in claim 14, in which the reflection coefficient series is derived from the autocorrelation function of the transducer output signal.

* * * * *